United States Patent
Uchino et al.

(10) Patent No.: US 9,591,626 B2
(45) Date of Patent: Mar. 7, 2017

(54) MOBILE STATION FOR PREVENTING INTERFERENCE IN THE UPLINK USING TIME-SWITCHED UPLINK CARRIER AGGREGATION

(71) Applicant: NTT DOCOMO, INC., Tokyo (JP)

(72) Inventors: Tooru Uchino, Tokyo (JP); Hideaki Takahashi, Tokyo (JP); Yuta Sagae, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 79 days.

(21) Appl. No.: 14/415,751

(22) PCT Filed: Jul. 5, 2013

(86) PCT No.: PCT/JP2013/068471
§ 371 (c)(1),
(2) Date: Jan. 20, 2015

(87) PCT Pub. No.: WO2014/013891
PCT Pub. Date: Jan. 23, 2014

(65) Prior Publication Data
US 2015/0195829 A1 Jul. 9, 2015

(30) Foreign Application Priority Data
Jul. 20, 2012 (JP) ................. 2012-161909

(51) Int. Cl.
*H04W 72/04* (2009.01)
*H04W 72/12* (2009.01)
(Continued)

(52) U.S. Cl.
CPC ......... *H04W 72/0413* (2013.01); *H04L 5/001* (2013.01); *H04L 5/0082* (2013.01);
(Continued)

(58) Field of Classification Search
None
See application file for complete search history.

(56) References Cited

U.S. PATENT DOCUMENTS

2012/0182958 A1   7/2012 Pelletier et al.

FOREIGN PATENT DOCUMENTS

| JP | 2010-279017 A | 12/2010 | |
|---|---|---|---|
| SE | WO 2011040852 A1 * | 4/2011 | ............. H04L 5/001 |
| WO | 2011/040852 A1 | 4/2011 | |

OTHER PUBLICATIONS

Extended Search Report issued in corresponding European Application No. 13819780.1, mailed Feb. 12, 2016 (7 pages).
(Continued)

*Primary Examiner* — Anh Ngoc Nguyen
(74) *Attorney, Agent, or Firm* — Osha Liang LLP

(57) ABSTRACT

To prevent the occurrence of interference in the uplink when carrying out "Time-Switched UL CA". A mobile station UE according to the present invention includes a UL transmission processing unit 11 configured to transmit uplink information at TTI# n+4 corresponding to TTI#n, using a CC allocated over a PDCCH to the mobile station UE at TTI# n by the radio base station eNB. The UL transmission processing unit 11 is configured to transmit the uplink information at each of TTIs using only one CC, and when TTI# n+4 is included in a "switching period" in which a CC used for the transmission of the uplink information is switched, the UL transmission processing unit 11 is configured not to transmit the uplink information at the TTI# n+4.

3 Claims, 5 Drawing Sheets

(51) Int. Cl.
  *H04L 5/00* (2006.01)
  *H04W 88/02* (2009.01)
(52) U.S. Cl.
  CPC .... *H04W 72/1226* (2013.01); *H04W 72/0446* (2013.01); *H04W 88/02* (2013.01)

(56) References Cited

OTHER PUBLICATIONS

NTT DOCOMO, Inc.; "Introduction of Time-Switched Uplink Carrier Aggregation"; 3GPP TSG-RAN WG2 Meeting #79, R2-124000; Qingdao, China; Aug. 13-17, 2012 (2 pages).

NTT DOCOMO, Inc.; "[Draft] LS on 1CC transmission scheme for uplink inter-band carrier aggregation"; 3GPP TSG-RAN WG4 Meeting #63, R4-123602; Prague, Czech Republic; May 21-25, 2012 (1 page).

International Search Report for corresponding International Application No. PCT/JP2013/068471, mailed Jul. 30, 2013 (1 page).

Written Opinion for corresponding International Application No. PCT/JP2013/068471, mailed Jul. 30, 2013 (4 pages).

NTT DOCOMO, Inc.; "Specification impacts of 1CC transmission in a TTI for UL CA;" 3GPP TSG-RAN WG2 #79, R2-123998; Qingdao, China; Aug. 13-17, 2012 (2 pages).

3GPP TS 36.300 V11.2.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2 (Release 11);" Jun. 2012 (201 pages).

NTT DOCOMO; "Discussion on 1CC transmission in a TTI for uplink inter-band carrier aggregation;" 3GPP TSG RAN WG4 Meeting #62bis, R4-121559; Jeju, Koria; Mar. 26-30, 2012 (4 pages).

Office Action in counterpart Japanese Patent Application No. 2012-161909, dated Sep. 13, 2016 (10 pages).

\* cited by examiner

- - -▶ INTERFERENCE VIA Diplexer
──▶ INTERFERENCE VIA Duplexer

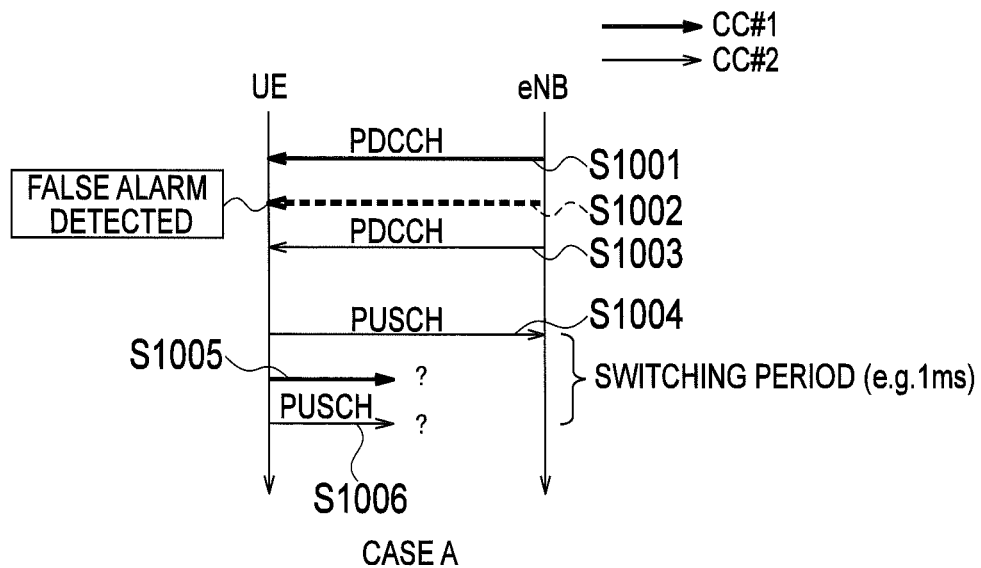
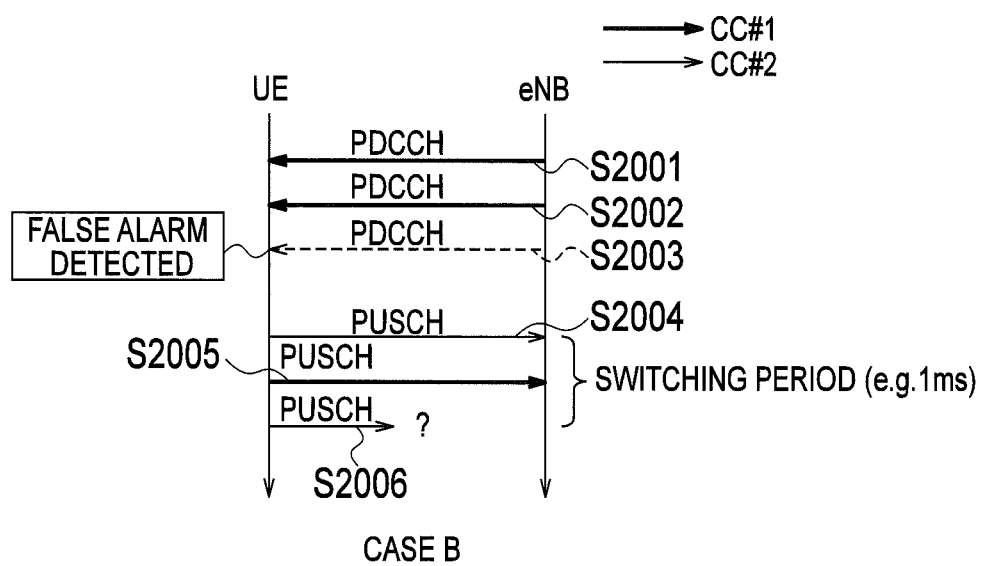

MOBILE STATION FOR PREVENTING INTERFERENCE IN THE UPLINK USING TIME-SWITCHED UPLINK CARRIER AGGREGATION

TECHNICAL FIELD

The present invention relates to a mobile station.

BACKGROUND ART

A mobile communication system of LTE (Long Term Evolution)-Advance scheme is configured to be able to execute "Uplink CA (Carrier Aggregation)" by using a plurality of CCs (Component Carriers) to transmit uplink information.

However, in a radio configuration for executing a conventional FDD system, a Duplexer is inserted to suppress any interference from an uplink bandwidth to a downlink bandwidth in the same band.

On the other hand, in "Inter-band CA", there occurs interference of signals from an uplink bandwidth transmitted in different bands into a downlink bandwidth in its own band. To suppress the interference, generally, additional insertion of a Diplexer is considered.

For example, in order to suppress interference of signals from an uplink bandwidth to a downlink bandwidth in a band #A/#B (solid line in FIG. 6), a Duplexer #A/#B is inserted.

In addition, for interference of signals from the uplink bandwidth in the band #A/#B to the downlink bandwidth in the band #B/#A (dotted line in FIG. 6), the interference signals can be suppressed similarly by inserting a Diplexer.

However, for interference of signals via the Diplexer from an uplink bandwidth to a downlink bandwidth of different bands, no action has been taken for signals generated from a plurality of uplink bandwidths.

In particular, there is a problem that due to this, transmission spurious, degraded receiving sensitivity, or reduction of transmission power and the like occur.

In order to solve the problem, an approach of "Time-Switched (TS) UL CA" is specified (see Non-patent Document 2, for example).

A mobile station UE which executes "Time-Switched UL CA" is configured to be restricted such that the mobile station UE can transmit uplink information from only one CC at each TTI (Transmission Time Interval).

As shown in FIG. 7, the mobile station UE which executes "Time-Switched UL CA" is configured to switch a CC used to transmit uplink information at every TTI.

Here, in practice, a "switching period" for switching a CC used to transmit uplink information is needed. Note that the "switching period" may be longer than 1 TTI (1 ms).

PRIOR ART DOCUMENT

Non-Patent Document

Non-patent document 1: 3GPP TS36.300
Non-patent document 2: 3GPP R4-121559

SUMMARY OF THE INVENTION

However, the following problems may occur when "Time-Switched UL CA" as described above is executed (see FIGS. 8 and 9).

First, a case A in which the problems may occur is described with reference to FIG. 8.

As shown in FIG. 8, when acquiring scheduling information on transmission of uplink information in CC#1 via a PDCCH (Physical Downlink Control Channel) in step S1001 (TTI#n), a mobile station UE transmits the uplink information via CC#1 in step S1004 (TTI#n+4).

Here, when the mobile station UE detects the scheduling information (detects "False Alarm") on transmission of the uplink information in CC#1 via the PDCCH, which is not actually transmitted by a radio base station eNB, in step S1002 (TTI#n+1) and acquires scheduling information on transmission of uplink information in CC#2 via the PDCCH in step S1003 (TTI#n+2), the mobile station UE is configured to transmit the uplink information via CC#1 in step S1005 (TTI#n+5) and transmit the uplink information in step S1006 (TTI#n+6).

In such a case, since TTI#n+6 is included in a "switching period", in step S1006, the mobile station UE transmits uplink information in a state in which the mobile station UE is tuned to neither CC#1 nor CC#2, that is to say, before switching of CC, to be used in transmission of uplink information, from CC#1 to CC#2 is complete. Thus, this causes a problem that interference in the uplink occurs.

Secondly, a case B in which the problems may occur is described with reference to FIG. 9.

As shown in FIG. 9, when acquiring scheduling information on transmission of uplink information in CC#1 via the PDCCH in step S2001/S2002 (TTI#n/TTI#n+1), the mobile station UE transmits the uplink information via CC#1 in step S2004/S2005 (TTI#n+4/TTI#n+5).

Here, when the mobile station UE detects scheduling information (detects "False Alarm") on transmission of uplink information in CC#2 via the PDCCH, which is not actually transmitted by the radio base station eNB, in step S2003 (TTI#n+2), the mobile station UE transmits the uplink information in step S2006 (TTI#n+6).

In such a case, since TTI#n+6 is included in a "switching period", in step S2006, the mobile station UE transmits the uplink information in a state in which the mobile station UE is tuned to neither CC#1 nor CC#2, that is to say, before switching of CC, to be used in transmission of uplink information, from CC#1 to CC#2 is complete. Thus, this causes a problem that interference in the uplink occurs.

Thus, the present invention has been made in view of such circumstances and has an objective of providing a mobile station capable of preventing the occurrence of interference in the uplink when carrying out "Time-Switched UL CA".

A first feature of the present invention is summarized as a mobile station configured to be able to carry out carrier aggregation using a plurality of component carriers in an uplink with a radio base station, including an uplink transmission processing unit configured to transmit uplink information at transmission time intervals. Here, the uplink transmission processing unit is configured to transmit the uplink information at each of the transmission time intervals using only one component carrier, and when the transmission time interval is included in a switching period in which a component carrier used for the transmission of the uplink information is switched, the uplink transmission processing unit is configured not to transmit the uplink information at the transmission time interval.

BRIEF DESCRIPTION OF THE DRAWINGS

FIG. 8 is a view for illustrating a problem of the conventional mobile communication system.

FIG. 9 is a view for illustrating a problem of the conventional mobile communication system.

DETAILED DESCRIPTION

Mobile Communication System According to First Embodiment of the Present Invention A mobile communication system according to a first embodiment of the preset invention is described with reference to FIGS. 1 to 5.

While in the embodiment, a description is given with a mobile communication system of LTE-Advanced scheme as an example, the present invention is not limited to the mobile communication system and is also applicable to any mobile communication system of other schemes.

Figure 1:
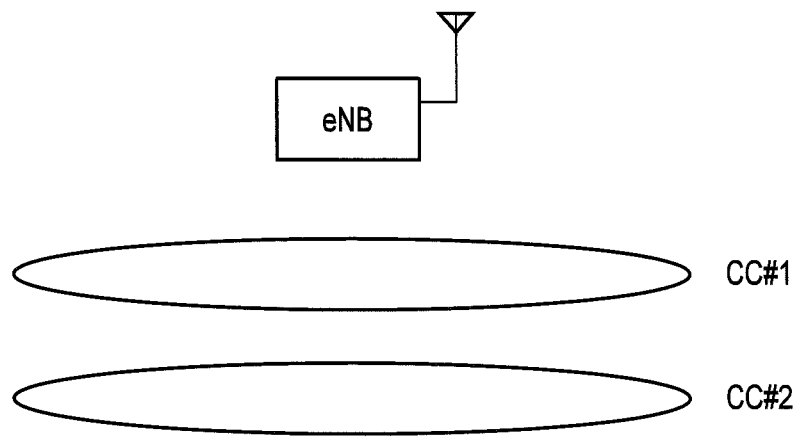
FIG. 1 is an overall configuration diagram of a mobile communication system according to a first embodiment of the present invention.
Figure 1:
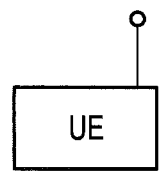

As shown in FIG. 1, the mobile communication system according to the embodiment includes a radio base station eNB configured to manage CC#1 and CC#2, and a mobile station UE.

In the mobile communication system according to the embodiment, the mobile station UE is configured to be able to execute CA using CC#1 and CC#2, more specifically, "Inter-band CA", in the uplink with the radio base station eNB.

Figure 2:
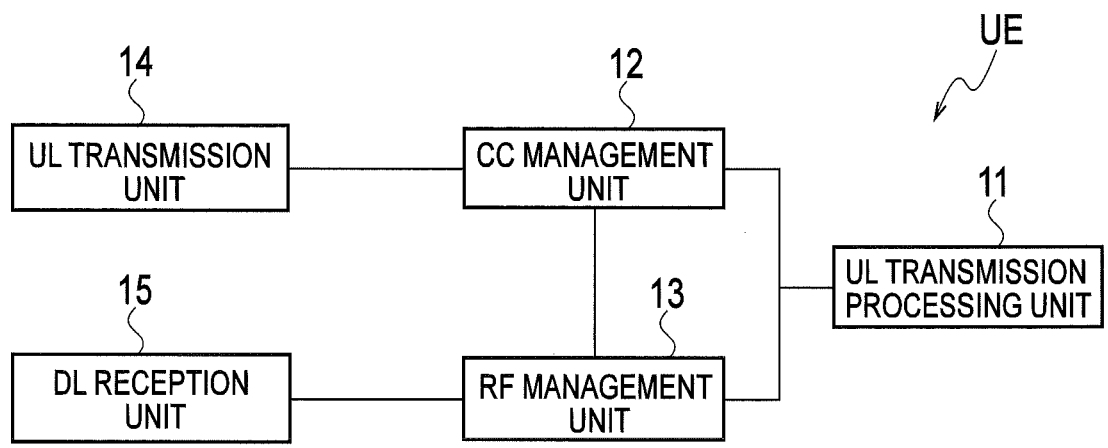
FIG. 2 is a functional block diagram of a mobile station according to the first embodiment of the present invention.

As shown in FIG. 2, the mobile station UE includes a UL transmission processing unit 11, a CC management unit 12, a RF management unit 13, a UL transmission unit 14, and a DL reception unit 15.

The UL transmission processing unit 11 is configured to transmit uplink information at TTI#n+4 corresponding to TTI#n using a CC allocated (scheduled) over a PDCCH to the mobile station UE at TTI#n by the radio base station eNB.

In addition, when the mobile station UE executes "Time-Switched UL CA", the UL transmission processing unit 11 is configured to transmit the uplink information in each TTI using only one CC.

The CC management unit 12 is configured to manage CCs used in CA and the RF management unit 13 is configured to manage bands used in "Inter-band CA".

The UL transmission unit 14 is configured with a transmitter and the DL reception unit 15 is configured with a receiver.

Hereinbelow, operation of the UL transmission processing unit 11 according to the embodiment is described with reference to FIGS. 3 and 4.

First, operation of the UL transmission processing unit 11 in the above-mentioned case A is described with reference to FIG. 3.

Figure 3:
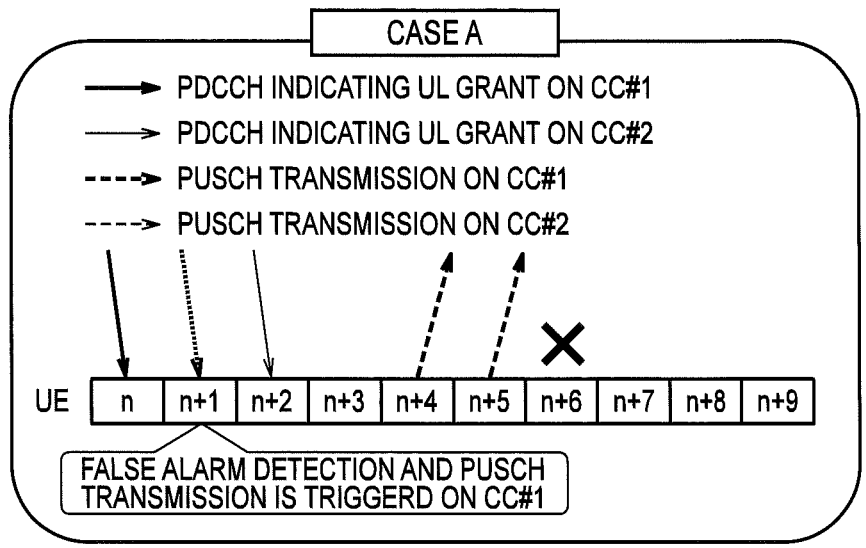
FIG. 3 is a view for illustrating operation of the mobile station according to the first embodiment of the present invention.

As shown in FIG. 3, when acquiring scheduling information on transmission of uplink information in CC#1 via the PDCCH at TTI#n, the UL transmission processing unit 11 is configured to transmit uplink information via CC#1 at TTI#n+4.

In addition, when at TTI#n+1, the UL transmission processing unit 11 detects the scheduling information (detects "False Alarm") on the transmission of the uplink information in CC#1 via the PDCCH, which is not actually transmitted by a radio base station eNB, and acquires scheduling information on transmission of uplink information in CC#2 via the PDCCH at TTI#n+2, the UL transmission processing unit 11 is configured to transmit the uplink information via CC#1 at TTI#n+5 and not to transmit the uplink information at TTI#n+6, since TTI#n+6 is included in a "switching period", unlike conventional operation as shown in FIG. 8.

Accordingly, this can avoid transmission of uplink information in a state in which the UL transmission processing unit 11 is tuned to neither CC#1 nor CC#2, that is to say, before switching of CC, to be used in transmission of uplink information, from CC#1 to CC#2 is complete. Thus, the occurrence of interference in the uplink can be prevented.

Secondly, operation of the UL transmission processing unit 11 in the above-mentioned case B is described with reference to FIG. 4.

Figure 4:
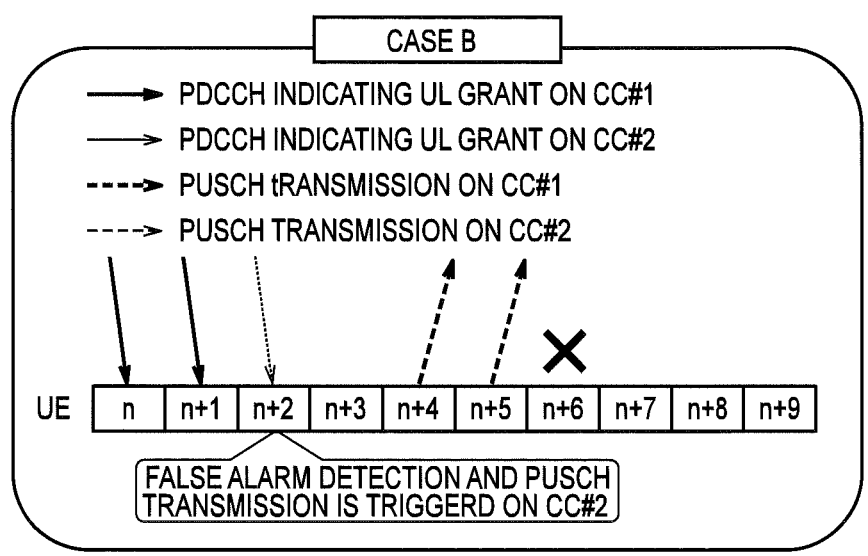
FIG. 4 is a view for illustrating the operation of the mobile station according to the first embodiment of the present invention.

As shown in FIG. 4, when acquiring scheduling information on transmission of the uplink information in CC#1 via the PDCCH at TTI#n and TTI#n+1, the UL transmission processing unit 11 is configured to transmit uplink information via CC#1 at TTI#n+4 and TTI#n+5

In addition, when detecting at TTI#n+2 scheduling information (detecting "False Alarm") on transmission of uplink information in CC#2 via the PDCCH, which is not actually transmitted by the radio base station eNB, the UL transmission processing unit 11 is configured not to transmit the uplink information at TTI#n+6, since TTI#n+6 is included in a "switching period", unlike conventional operation as shown in FIG. 9.

Accordingly, this can avoid transmission of uplink information in a state in which the UL transmission processing unit 11 is tuned to neither CC#1 nor CC#2 at TTI#n+6, that is to say, before switching of CC, to be used in transmission of uplink information, from CC#1 to CC#2 is complete. Thus, the occurrence of interference in the uplink can be prevented.

More specifically, if the above-mentioned TTI#n+6 is included in the "switching period" for switching a CC to be used in transmission of uplink information, the UL transmission processing unit 11 is configured not to transmit the uplink information in the TTI#n+6.

Here, specifically, the UL transmission processing unit 11 may be configured to generate uplink information (MAC-PDU) in a MAC (Media Access Control) layer and not to transmit the uplink information (MAC-PDU) in a physical layer.

Preferably, even in such a case, the UL transmission processing unit 11 is configured to execute retransmission of a following HARQ as usual.

In addition, the UL transmission processing unit 11 may be configured to retain uplink information (MAC-PDU) which is not transmitted at TTI#n+6, without discarding the uplink information (MAC-PDU).

Note that the UL transmission processing unit 11 is configured to monitor a delivery confirmation result on the uplink information (MAC-PDU) transmitted via a PHICH (Physical Hybrid-ARQ Indicator Channel) or an "UL grant (for Adaptive retransmission)".

In addition, in an example of the case A as shown in FIG. 3, it is preferable that the radio base station eNB is configured not to transmit at TTI#n+1 scheduling information on transmission of uplink information in CC#1 or CC#2 via the PDCCH, considering existence of the "switching period".

Similarly, in an example of the case B as shown in FIG. 4, it is preferable that the radio base station eNB is configured not to transmit at TTI#n+2 scheduling information on transmission of uplink information in CC#2 via the PDCCH, considering existence of the "switching period".

In the following, the operation of the mobile station UE according to the embodiment is described with reference to FIG. 5.

Figure 5:
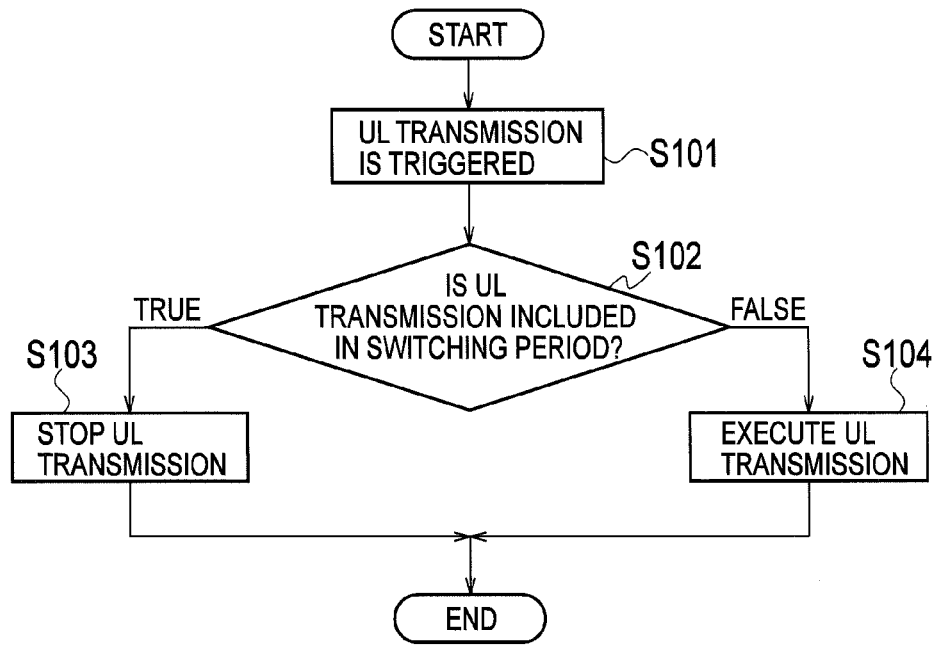
FIG. 5 is a flow chart showing the operation of the mobile station according to the first embodiment of the present invention.
Figure 6:
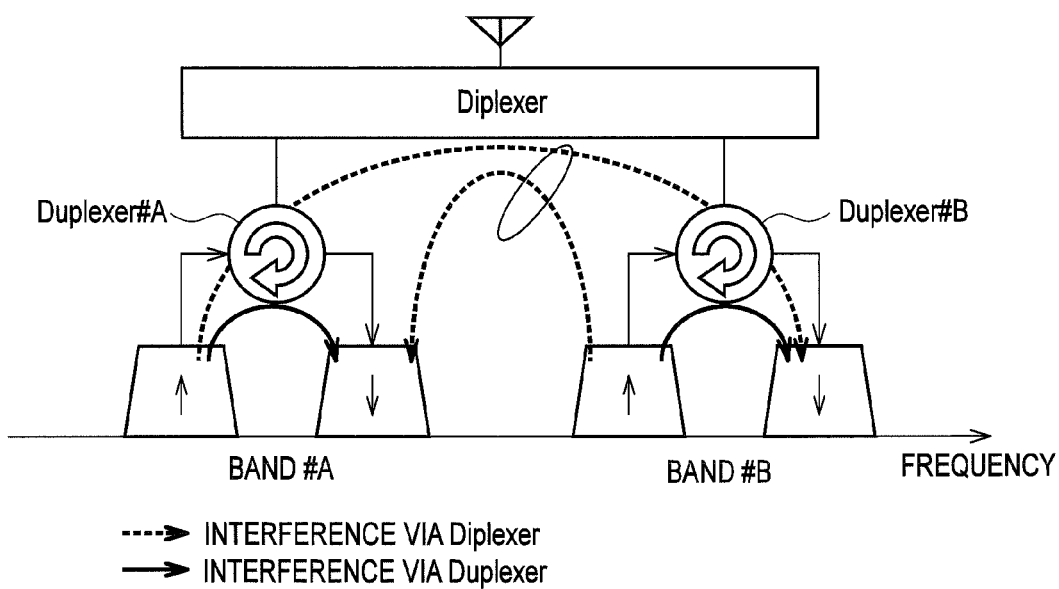
FIG. 6 is a view for illustrating a conventional mobile communication system.
Figure 7:
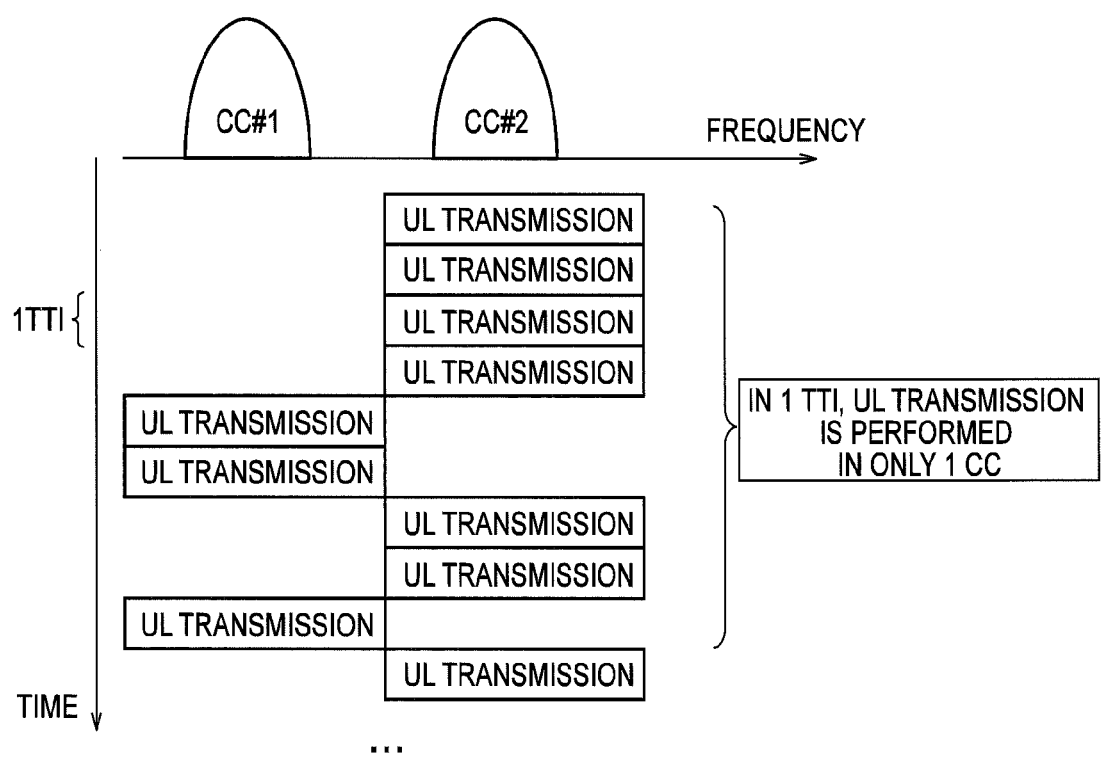
FIG. 7 is a view for illustrating a conventional mobile communication system.

As shown in FIG. 5, when transmission of uplink information is triggered in step S101, that is to say, when the mobile station UE acquires scheduling information on the transmission of the uplink information via the PDCCH, the mobile station UE judges whether or not the TTI to transmit the uplink information is included in a "switching period" in step S102.

If the mobile station UE judges that the TTI which should transmit the uplink information is included in the "switching period", the mobile station UE stops transmission of the uplink information in step S103.

On the one hand, if the mobile station UE judges that the TTI which should transmit the uplink information is not included in the "switching period", the mobile station UE transmits the uplink information in the TTI in step S104.

When "Time-Switched UL CA" is carried out, the mobile communication system according to the embodiment can avoid transmission of uplink information before switching of CC to be used in transmission of the uplink information is complete. Hence, the occurrence of interference in the uplink can be prevented.

The features of the embodiment may also be expressed as follows.

A first feature of the embodiment is summarized as a mobile station UE configured to be able to carry out CA (carrier aggregation) using a plurality of CCs (component carriers) in an uplink with a radio base station eNB, including: a UL transmission processing unit 11 (a uplink transmission processing unit) configured to transmit uplink information at TTI#n+4 (second transmission time interval) corresponding to TTI#n, using a CC allocated over a PDCCH (a Physical Downlink Control Channel) to the mobile station UE at TTI# n (first transmission time interval) by the radio base station eNB. Here, the UL transmission processing unit 11 is configured to transmit the uplink information at each of TTIs using only one CC, and when TTI#n+4 is included in a "switching period" in which a CC used for the transmission of the uplink information is switched, the UL transmission processing unit 11 is configured not to transmit the uplink information at the TTI#n+4.

In the first feature of the embodiment, the UL transmission processing unit 11 may be configured to retain uplink information which has not been transmitted at the TTI#n+4, without discarding the uplink information.

In addition, in the embodiment described above, while the description is given with the uplink information triggered by the PDCCH addressed to the mobile station UE as an example, the present invention is also applicable to transmission of other uplink information, such as uplink information transmission of which is autonomously triggered by a mobile station UE without passing through a PDCCH (Physical Downlink Control Channel).

It is assumed that the uplink information transmission of which is autonomously triggered by the mobile station UE includes uplink information transmitted via a PRACH (Physical Random Access Channel), SRS (Sounding Reference Signal) or uplink information transmitted via an a PUCCH (Physical Uplink Control Channel), and the like.

A first feature of the embodiment is summarized as a mobile station UE configured to be able to carry out carrier aggregation using a plurality of CCs in an uplink with a radio base station eNB, including a UL transmission processing unit configured to transmit uplink information at TTI# n+4 (transmission time intervals). Here, the UL transmission processing unit 11 is configured to transmit the uplink information at each of TTIs using only one CC, and when TTI# n+4 is included in a "switching period" in which a CC used for the transmission of the uplink information is switched, the UL transmission processing unit 11 is configured not to transmit the uplink information at the TTI# n+4.

It should be noted that the foregoing operations of the mobile station UE and the radio base station eNB may be implemented by hardware, may be implemented by a software module executed by a processor, or may be implemented in combination of the two.

The software module may be provided in a storage medium in any format, such as a RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to a processor so that the processor can read and write information from and to the storage medium. Instead, the storage medium may be integrated in a processor. The storage medium and the processor may be provided inside an ASIC. The ASIC may be provided in the mobile station UE and the radio base station eNB. Otherwise, the storage medium and the processor may be provided as discrete components inside the mobile station UE and the radio base station eNB.

Hereinabove, the present invention has been described in detail by use of the foregoing embodiments. However, it is apparent to those skilled in the art that the present invention should not be limited to the embodiments described in the specification. The present invention can be implemented as an altered or modified embodiment without departing from the spirit and scope of the present invention, which are determined by the description of the scope of claims. Therefore, the description of the specification is intended for illustrative explanation only and does not impose any limited interpretation on the present invention.

Note that the entire content of Japanese Patent Application No. 2012-161909 (filed on Jul. 20, 2012) is incorporated by reference in the present specification.

INDUSTRIAL APPLICABILITY

As described above, according to the present invention, when "Time-Switched UL CA" is carried out, a mobile station capable of preventing the occurrence of interference in the uplink can be provided.

EXPLANATION OF THE REFERENCE NUMERALS eNB radio base station
UE mobile station
11 UL transmission processing unit
12 CC management unit
13 RF management unit 14 UL transmission unit
15 DL reception unit

The invention claimed is:

1. A mobile station configured to be able to carry out carrier aggregation using a plurality of component carriers in an uplink with a radio base station, comprising: an uplink transmission processing unit configured to transmit uplink information at transmission time intervals,
wherein
the uplink transmission processing unit is configured to transmit the uplink information at each of the transmission time intervals using only one component carrier, and
when the transmission time interval is included in a switching period in which a component carrier used for the transmission of the uplink information is switched, the uplink transmission processing unit is configured not to transmit the uplink information at the transmission time interval, and
the uplink information is uplink information transmitted via a Physical Random Access Channel (PRACH), Sounding Reference Signal (SRS), or uplink information transmitted via a Physical Uplink Control Channel (PUCCH).

2. The mobile station according to claim 1, wherein the uplink transmission processing unit is configured to retain uplink information which has not been transmitted at the transmission time intervals, without discarding the uplink information.

3. The mobile station according to claim 1,
wherein when the uplink information is to be transmitted using a second component carrier at the succeeding transmission time interval in which the uplink information is transmitted using a first component carrier and when the succeeding transmission time interval is included in a switching period in which a component carrier used for the transmission of the uplink information is switched, the uplink transmission processing unit is configured not to transmit the uplink information at the succeeding transmission time interval.

* * * * *